US008931082B2

(12) United States Patent
Rodgers et al.

(10) Patent No.: US 8,931,082 B2
(45) Date of Patent: Jan. 6, 2015

(54) MULTI-SECURITY-CPU SYSTEM

(71) Applicant: Broadcom Corporation, Irvine, CA (US)

(72) Inventors: Stephane Rodgers, San Diego, CA (US); Andrew Dellow, Minchinhampton (GB)

(73) Assignee: Broadcom Corporation, Irvine, CA (US)

( * ) Notice: Subject to any disclaimer, the term of this patent is extended or adjusted under 35 U.S.C. 154(b) by 17 days.

(21) Appl. No.: 13/705,991

(22) Filed: Dec. 5, 2012

(65) Prior Publication Data

US 2014/0053230 A1    Feb. 20, 2014

Related U.S. Application Data

(60) Provisional application No. 61/684,479, filed on Aug. 17, 2012, provisional application No. 61/729,002, filed on Nov. 21, 2012.

(51) Int. Cl.
*H04L 29/06* (2006.01)
*G06F 21/12* (2013.01)
*G06F 21/74* (2013.01)
*G06F 21/72* (2013.01)

(52) U.S. Cl.
CPC .............. *G06F 21/123* (2013.01); *G06F 21/74* (2013.01); *G06F 21/72* (2013.01)
USPC .......................... 726/18; 726/20; 348/E5.004

(58) Field of Classification Search
None
See application file for complete search history.

(56) References Cited

U.S. PATENT DOCUMENTS

| | | | | |
|---|---|---|---|---|
| 2003/0233553 | A1* | 12/2003 | Parks et al. | 713/178 |
| 2004/0034823 | A1* | 2/2004 | Watkins et al. | 714/724 |
| 2005/0204155 | A1* | 9/2005 | Ravi et al. | 713/200 |
| 2007/0209072 | A1* | 9/2007 | Chen | 726/16 |
| 2007/0294745 | A1* | 12/2007 | Tan et al. | 726/2 |
| 2008/0219494 | A1* | 9/2008 | Chen | 382/100 |
| 2012/0079287 | A1* | 3/2012 | Leclercq | 713/192 |
| 2013/0212671 | A1* | 8/2013 | Wang et al. | 726/16 |

OTHER PUBLICATIONS

"Broadcom Debuts Industry's First Digital Cable Set-Top Box System-on-a-Chip (SOC) With HD AVC/VC-1 Decoding, Channel Bonding and Downloadable Security," www.prnewswire.com/news-releases/broadcom-debuts-industrys-first . . . , retrieved Aug. 23, 2012 (5 pages).

\* cited by examiner

*Primary Examiner* — Hadi Armouche
*Assistant Examiner* — Andrew Steinle
(74) *Attorney, Agent, or Firm* — Brinks Gilson & Lione

(57) ABSTRACT

A computing system includes a first security central processing unit (SCPU) of a system-on-a-chip (SOC), the first SCPU configured to execute functions of a first security level. The computing system also includes a second SCPU of the SOC coupled with the first SCPU and coupled with a host processor, the second SCPU configured to execute functions of a second security level less secure than the first security level, and the second SCPU executing functions not executed by the first SCPU.

20 Claims, 4 Drawing Sheets

MULTI-SECURITY-CPU SYSTEM

1. CROSS REFERENCE TO RELATED APPLICATIONS

This application claims the benefit of priority to U.S. Provisional Application No. 61/684,479, filed Aug. 17, 2012, and U.S. Provisional Application No. 61/729,002, filed Nov. 21, 2012, which are incorporated herein by reference.

2. TECHNICAL FIELD

This disclosure relates to system security performed by a security central processing unit (SCPU), and more particularly, to security functions performed in a system by multiple SCPUs operating at different security levels.

3. BACKGROUND

Rapid advances in electronics and communications technologies, driven by consumer demand, have resulted in the widespread adoption of data-driven devices, including those for handling and converting third-party media content. Third-party customers or clients want their content handled with security such that the content is not copied or used outside of certain permission levels. Systems that stream content digitally for multiple media providers to consumers seek to include higher levels of security so that competitor providers cannot access each other's secrets. In a large system on a chip (SOC), a single security central processing unit (SCPU) may perform security functions.

BRIEF DESCRIPTION OF THE DRAWINGS

The systems and methods may be better understood with reference to the following drawings and description. In the figures, like reference numerals designate corresponding parts throughout the different views.

DETAILED DESCRIPTION

The discussion below makes reference to system security performed by a security central processing unit (SCPU), and more particularly, to security functions performed in a system by multiple SCPUs operating at different security levels. For purposes of explanation, two SCPUs are described, but more SCPUs may be implemented. The SCPUs may be instantiated on a system on a chip (SOC) such as may be used in a set top box (STB) for streaming media to consumers. Such media may include audio or audio/video content viewable by consumers on media devices.

In a large system on a chip (SOC) with a single security central processing unit (SCPU) that performs security functions, the system trust level may be binary: either the operation is highly secure, or it is completely untrusted. For operations that require an intermediate level of security, there exist two choices: (1) perform these operations in the SCPU; or (2) perform them in the host.

The first option may not be ideal because the SCPU may be responsible for highly sensitive tasks, like managing one time password (OTP) authentication, routing customer secrets, and the like. Mixing these highly sensitive tasks with lower security functions may create risk and detract from the main mission of the SCPU. The second option may not be ideal because performing intermediate security tasks in the host may leave the SOC unsecured, as the host CPU may not be trusted.

Executing security functions by a host on the chip may open up security too wide to provide sufficient security to chip operation. And, mixing highly secure and less secure functions as executed by a single SCPU may open system security up to some level of risk and detract from the main mission of a SCPU to secure the most sensitive functions of chip operation.

Furthermore, because the SCPU manages proprietary information to the SOC vendor, allowing the SCPU to be programmed by an end user customer may be problematic. Yet some of the intermediate level security tasks are better performed by end user code, and thus the SOC vendor may want to allow the customer to program aspects of SCPU functionality. To allow the user to program functions by the only SCPU on the chip may open up the security operation of the chip to additional risk and attack.

In an SOC, having a single SCPU may no longer be sufficient. Using a multi-security CPU approach, such as with a first SCPU dedicated for highly secure functions and a second SCPU used for lower security tasks, like digital rights management (DRM), managing transcoding, watermarking, etc. For purposes of explanation, the first SCPU is labeled security CPU-A herein, and the second security level SCPU is labeled security CPU-B.

Figure 1:
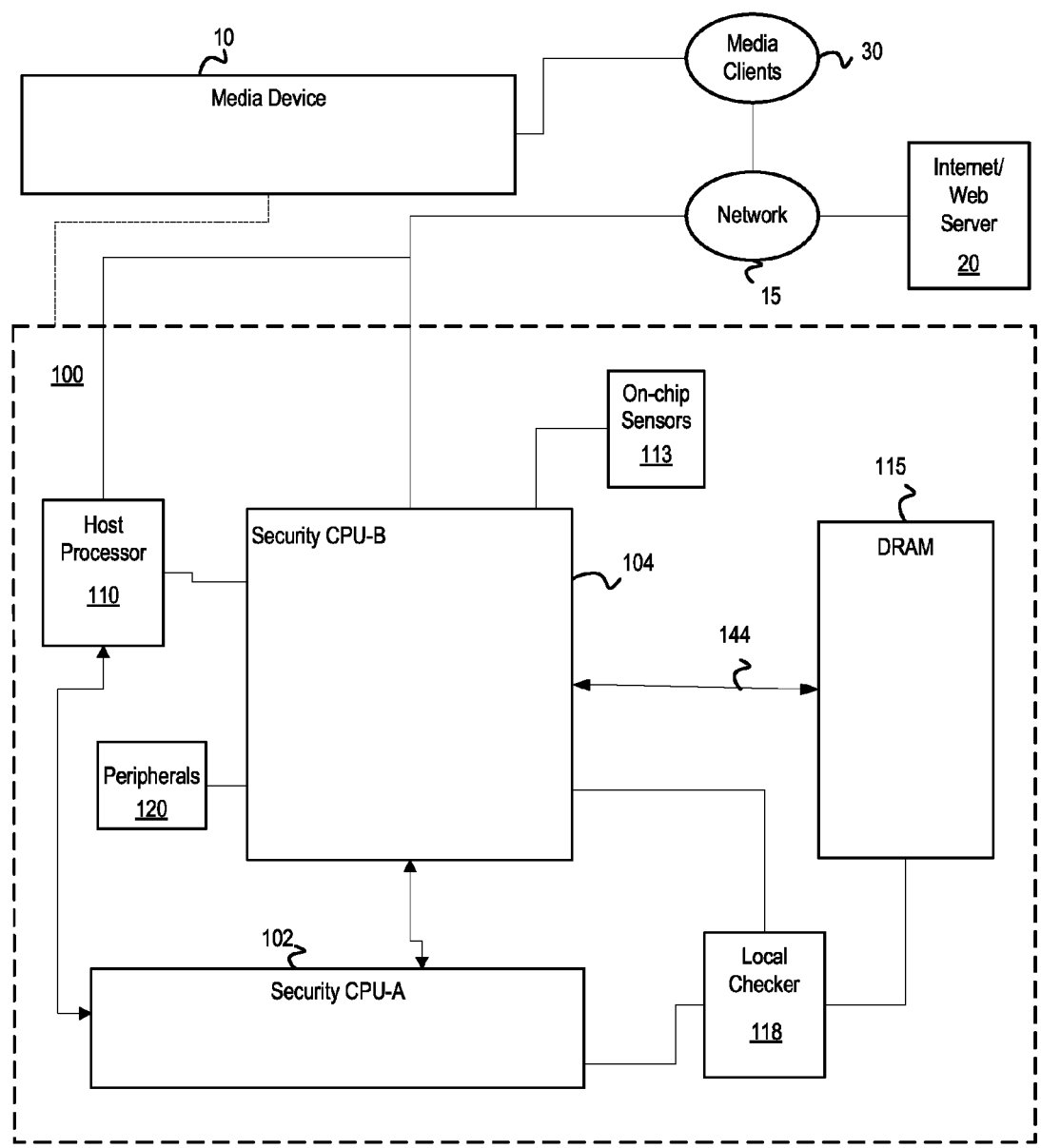
FIG. 1 is a block diagram of an exemplary multi-security central processing unit (CPU) system on a chip in an operating environment.
Figure 2:
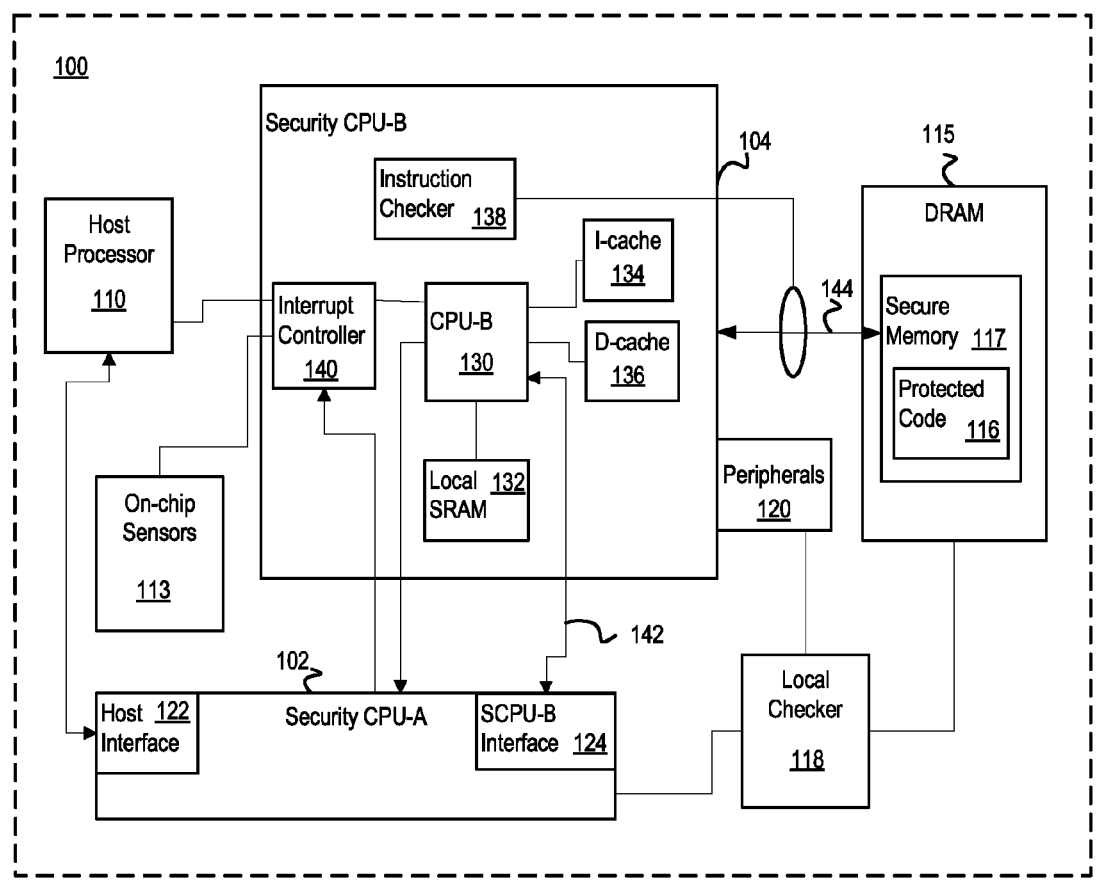
FIG. 2 is a more-detailed block diagram of the exemplary multi-security central processing unit (CPU) system on the chip as disclosed in FIG. 1.

FIG. 1 is an example diagram of a multi-security central processing unit (SCPU) system on a chip (SOC) 100 in an operating environment. The SOC 100 may be integrated within or coupled with a media device 10 when deployed into operation. FIG. 2 is a more-detailed block diagram of the exemplary multi-security central processing unit (CPU) system on the chip as disclosed in FIG. 1.

With reference to FIGS. 1 and 2, the system 100 may include first SCPU 102 also referred to as security CPU-A, second SCPU 104 also referred to as CPU-B, and a host processor 110, the general-purpose processor that runs the majority of the chip operation. The security CPU-A may be smaller than the security CPU-B and be configured to operate at a first security level higher than a second security level at which security CPU-B operates. The security CPU-B may be provided a higher trust level than the host processor 110 and the host processor may be denied execution of the second security level functions. The host processor 110 may also, at least in part, be located outside of the SOC 100.

Functions of security CPU-A at the first security level may include, for example, managing root keys, performing an initial secure boot, and routing secrets of a third-party content provider. Functions of security CPU-B at the second security level include, for example, digital rights management, license management, transcoder management, watermarking, and manipulation of data in secure memory. The security CPU-A may be configured with software code that treats commands from the security CPU-B as privileged, and that generates multiple unique commands for execution by the security CPU-B that are not executable by the host processor 110.

As configured to perform the majority of the processor-intensive security functions, the security CPU-B may be nearly as powerful as the host processor 110 in some implementations, and may, for instance, at the time of filing, perform up to 1,000 or 1,500 or more Dhrystone million instructions per second (DMIPS). As such, the security CPU-B maybe focused on lower security functions. Security CPU-A may need a fraction of the power and operate at less than 1,000 DMIPS.

The system 100 may further include on-chip sensors 113, memory such as dynamic random access memory (DRAM) 115, a local checker 118 coupled with the security CPU-A and multiple peripherals 120 of the security CPU-B. "Coupled with" herein may mean to be directly connected to a component or indirectly connected through one or more components. The DRAM 115 may include a portion of which is protected code 116 stored in secure memory 117. The secure memory 117 may be partitioned into specific or identified regions of the DRAM.

The security CPU-A may include a host interface 122 to communicate with the host processor 110 and an SCPU-B interface 124 with which to communicate with the security CPU-B. The security CPU-B may include a CPU-B 130, a local static random access memory (SRAM) 132, an instruction cache (i-cache) 134, a data cache (d-cache) 136, an instruction checker 138 and an interrupt controller 140. The local SRAM 132 may be private local memory for access by the security CPU-B in which instructions may be saved and data temporarily stored that is not accessible to the host processor 110 or to other on-chip entities or clients.

The security CPU-B and the security CPU-A may be coupled together with a dedicated, secure communications bus 142 that operates as a private channel between the CPU-B 130 and the security CPU-A. The secure communications bus 142 may be inaccessible by the host processor and inaccessible by third-party clients that exist on the SOC 100. The secure communications bus 142 may be configured with a combination of hardware and firmware and perform a master slave relationship in which, in some operations, the security CPU-A is either the master of or slave to the security CPU-B. For instance, the security CPU-A may be the master of booting CPU-B securely in memory. But, the security CPU-A may also receive commands from security CPU-B or the local checker 118, for instance.

A third party that exists on the SOC 100 may have its own CPU, its own block of logic, or exist on the chip as a combination of hardware and software having access to capabilities of the SOC 100. The third party CPU may include a secure interface managed by the CPU-A.

The system 100 may further include a common register bus 144 to which third-party clients that exist on the SOC 100 have access. The common register bus 144 may be used to write into registers of the memory 115. The security CPU-A may be configured to prevent certain on-chip clients from stopping security CPU-B from operating as intended, as disclosed herein.

The local checker 118, which may be coupled with the security CPU-A and security CPU-B, may be a piece of hardware configured to prevent some clients or hardware existing on the SOC 100 from accessing certain regions of the DRAM. Likewise, the local checker 118 may prevent blocking access by the security CPU-B to the common register bus 144 and/or to reading from and writing to the DRAM of the SOC 100.

The security CPU-A may also program the local checker 118 to ensure internal peripherals 120 of the security CPU-B are inaccessible by third-party entities having access to the host processor 110. The peripherals may include, but not be limited to, a Universal Asynchronous Receiver/Transmitter (UART), a timer, an interrupt, memory, data storage, a media device, or a combination thereof.

The instructions checker 138 may monitor instructions to be executed out of the DRAM and determine whether instructions called for execution from the secure memory by a component are cleared for execution by that component. To clear instructions for execution, the instruction checker 138 may ensure that the security CPU-B does not operate outside of a region of the secure memory 117 that has been authenticated for secure operation or conditional access by the host processor 110. For example, the instruction checker may monitor reads and writes to the DRAM 115 and compare the DRAM addresses of those memory accesses with an address range set up by the security CPU-A as a pre-authenticated region for execution of the instructions. If the security CPU-B attempts to execute instructions outside of the region of memory, the security CPU-B maybe rebooted or the entire SOC be reset.

In one example, the content saved to the secure memory 117 may include media content that a client does not want distributed in an unauthorized manner. The security CPU-B may decrypt the content for viewing on a consumer device, but not allow other peripherals to access or distribute the content outside of the system 100. The security CPU-B may ensure a consumer can view the content but not be directly accessed by the host. The security CPU-A and CPU-B may set up hardware that limits certain chip components in their access to the secure memory 117. For example, the security CPU-A and security CPU-B may make a region of memory off limits to the host processor. Furthermore, the security CPU-B may perform watermarking or manipulate time stamps with regards to content that a consumer may view.

More particularly, the secure memory 117 may be accessible exclusively to the security CPU-A and CPU-B and to local decompression and rendering engines. Thus, the security CPU-B may decrypt content into this memory region and then local display processes may read the decrypted content for local rendering. None of these steps requires the host processor 110 to have access to the secure memory. The security CPU-B may ensure a secure data flow by decrypting the content into this restricted region, out of reach of the host processor.

The interrupt controller 140 may be coupled with the security CPU-A and be configured to monitor the on-chip conditions from data generated by the sensors 113. The on-chip sensors 113 may generate data related to attributes of the chip such as, for example, temperature, voltage levels at specific points on the chip, clock speed and the like. If one of these attributes varies too much or in the wrong way, it may be indicative of a potential intrusion or hacker trying to disrupt normal operation of the SOC that would allow access to secure data and/or secure operation. The interrupt controller 140 may aggregate and mask interrupts from other functional blocks of the SOC 100 that may include interrogation of the sensors to detect predetermined threshold values of those sensors for use in determining whether or not the interrupt controller 140 masks an interrupt.

Furthermore, the interrupt controller 140 may generate an interrupt or a hookup in response to detecting conditions indicative of an intrusion. The interrupt or hookup may adjust operation of the host processor 110 or the security CPU-B in real time to ensure secure system operation. The host processor may also have a separate memory buffer than the memory buffer the security CPU-B uses, where the memory buffer for the security CPU-B may be configured as not accessible by the host processor 110 and configured to provide control logic to the second security CPU-B.

With further reference to FIG. 1, the system 100 may communicate over a network 15 such as the Internet or any wide or local area network to communicate with a Web server 20 and media clients 30. The clients 30 may be the customers that procure the SOC 100 for use by consumers to stream media content to consumer media devices 10. The security CPU-B may obtain the time and day over the Internet from the Web server 20 using a secure protocol. The time and day may then be considered secure time and be stored by the security CPU-B in either the local SRAM 132 or the secure memory 117 in DRAM 115. So stored, the security CPU-B may prevent access by the host processor or other on-chip programmed components to the secure time, which may be used by digital rights management and other forms of lower level security functions during execution of the secure functions.

Figure 3:
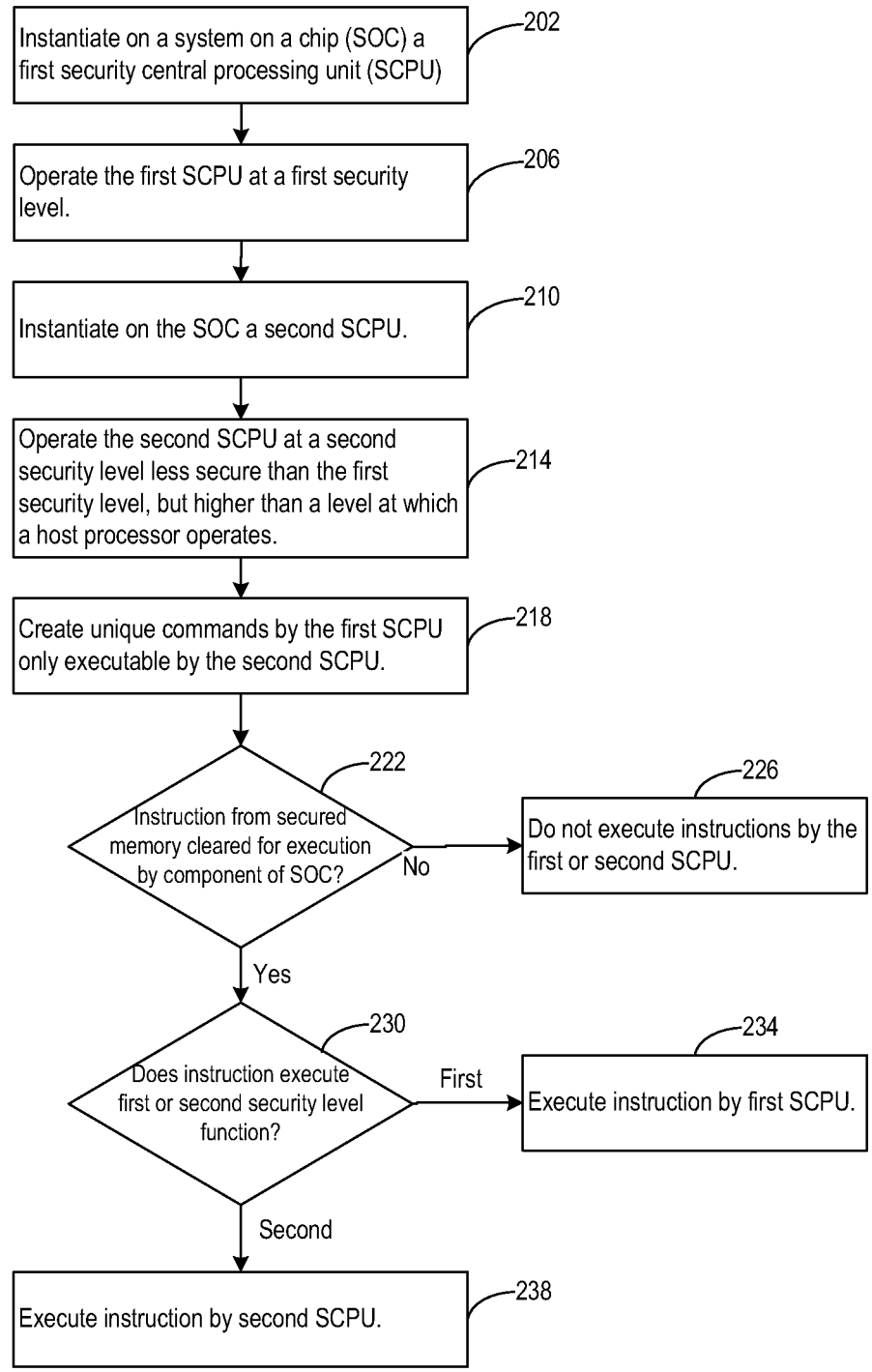
FIG. 3 is a flow chart of an exemplary method for implementing the multi-security CPU system on a chip of FIG. 1.

FIG. 3 is an example flow chart of a method for implementing the multi-security CPU system of FIG. 1. A system on a chip (SOC) may include a first security central processing unit (SCPU) and a second SCPU (202, 210). The SOC may operate the first SCPU at a first security level (206). The SOC may operate the second SCPU at a second security level less secure than the first security level, but higher than a level at which a host processor operates (214). The first SCPU may create commands only executable by the second SCPU (218).

The second SCPU may determine whether an instruction called for execution from secure memory is cleared for execution by a component of the SOC calling the instruction (222). If the component is not cleared to execute the instruction, neither the first nor the second SCPU are permitted to execute the instruction (226). If the component is cleared to execute the instruction, the second SCPU may determine whether the instruction executes a first or the second security level function (230). If the component requests to execute a first security function, the first SCPU executes the instruction (234). If the component requests to execute a second security function, the second SCPU executes the instruction (238). The first SCPU may also be the requestor component of either the first or second security functions and the second SCPU may be the requestor component of either first or second security functions, depending on the function.

Figure 4:
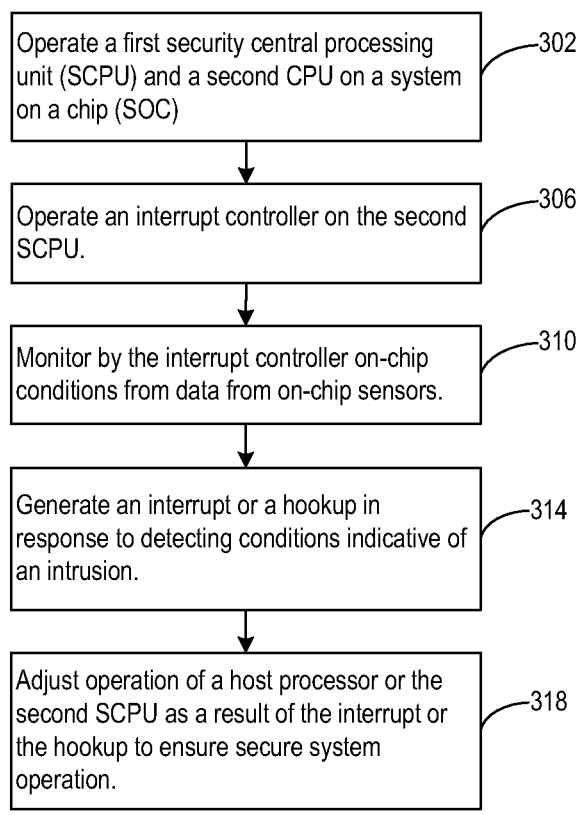
FIG. 4 is a flow chart of an exemplary method for implementing intrusion detection within the multi-security CPU system on a chip of FIG. 1.

FIG. 4 is a flow chart of an exemplary method for implementing intrusion detection within the multi-security CPU system on a chip of FIG. 1. A system on a chip (SOC) may operate a first security central processing unit (SCPU) and a second SCPU (302). The second SCPU may operate an interrupt controller (306). The interrupt controller may monitor on-chip conditions of the SOC by monitoring data received from on-chip sensors (310). The on-chip conditions may include, for example, temperature, voltage levels at specific points on the chip, clock speed and the like. The second SCPU may generate an interrupt or hookup in response to detecting conditions indicative of an intrusion (314). The second SCPU may adjust operation of a host processor or the second SCPU as a result of the interrupt or the hookup to ensure secure system operation (318).

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A computing system, comprising:
a memory storage device comprising a secured portion;
a host processor communicably coupled to the memory storage device, the host processor configured to receive requests from a client device to access data in the secured portion of the memory storage device;
a first security central processing unit (SCPU) comprising a security processor configured to execute functions of a first security level comprising verification of identity of the client device;
a second SCPU communicably coupled with the first SCPU and communicably coupled with the host processor, the second SCPU comprising a security processor configured to execute functions of a second security level less secure than the first security level and more secure than a level of security of functions executed by the host processor, the functions of the second security level comprisinq decryption of the data requested by the client device from the memory storage device;
peripheral devices configured to operate in response to instructions from the security processor of the second SCPU; and
the host processor being configured to transmit the decrypted data to the client device, wherein the host processor is disallowed access to the decrypted data until decrypted by the second SCPU.

2. The computing system of claim 1, where the first SCPU is programmed by a vendor and the second SCPU is programmable by an end user of the computing system.

3. The computing system claim 1, further comprising a dedicated, secure communications bus connecting the first and second SCPUs, the secure communications bus inaccessible by other components of the computing system.

4. The computing system of claim 1, further comprising a common register bus coupled with the second SCPU to which the client device has access.

5. The computing system of claim 1, where,
the host processor is further configured to receive a request from the client device to stream media content to a media device, the media content being stored in encrypted form in the memory storage device; and
the first security level functions, executed by the first SCPU in response to the request received by the host processor, comprise management of root keys associated with the encrypted media content, and performance of an initial secure boot.

6. The computing system of claim 5, where,
the second SCPU is configured to decrypt the encrypted media content, in response to the request received by the host processor, using the root keys, and the second security level functions comprising digital rights management, license management, transcoder management, watermarking, and manipulation of the decrypted media content in the secured portion of the memory storage device.

7. The computing system of claim 6, where
the second SCPU is configured to render the decrypted media content; and
the host processor disallowed access to the decrypted media content until rendered by the second SCPU.

8. The computing system of claim 1, where the first SCPU is further configured with software code that treats commands from the second SCPU as privileged, and that generates multiple unique commands for execution by the second SCPU that are not executable by the host processor.

9. The computing system of claim 6, where the second SCPU includes an instruction checker configured to determine whether instructions called for execution by the second SCPU are located within the secured portion of the memory storage device.

10. The computing system of claim 9, where the instruction checker causes the computing system to be reset in response to a detected attempt to execute instructions by the second SCPU outside of the secured portion of the memory storage device.

11. A system on a chip (SOC) comprising:
a host processor configured to operate the SOC;
a plurality of sensors configured to measure on-chip conditions to detect possible intrusion by an attacker;
a first security central processing unit (SCPU) configured to execute functions of a first security level; and
a second SCPU coupled with the first SCPU and the host processor, the second SCPU configured to execute functions of a second security level less secure than the first security level, and the second SCPU comprising an interrupt controller configured to monitor the on-chip conditions by monitoring measurements from the sensors, and to generate an interrupt or a hookup in response to detection of measurements indicative of an intrusion, the interrupt or hookup generated to adjust operation of the host processor or second SCPU in real time to ensure secure system operation.

12. The system on a chip of claim 11, further comprising a dedicated, secure communications bus connecting the first and second SCPUs, the secure communications bus inaccessible by the host processor and inaccessible by third-party clients with access to the host processor on the SOC.

13. The system on a chip of claim 11, further comprising a secure memory, where the second SCPU includes an instruction checker configured to determine whether instructions called for execution from the secure memory by a component are cleared for execution by that component.

14. The system on a chip of claim 11, further comprising separate memory buffers for the host processor and the second SCPU, the memory buffer for the second SCPU configured as not accessible by the host processor and configured to provide control logic to the second SCPU.

15. A system on a chip (SOC) comprising:
a host processor configured to operate the SOC;
a peripheral device configured to execute functions in response to instructions received by the peripheral device;
a first security central processing unit (SCPU), the first SCPU configured to execute functions of a first security level;
a second SCPU coupled with the first SCPU, the host processor, and the peripheral device, the second SCPU configured to execute functions of a second security level less secure than the first security level;
a memory storage device configured to store functions of the second security level in a secure section of the memory storage device;
an instruction checker configured to determine whether instructions called for execution by the second SCPU are located within the secure section of the memory storage device and to prevent access by the host processor to specified regions of the memory storage device: and
a local checker coupled with the first SCPU, the local checker configured to make the peripheral device inaccessible to third-party clients of the SOC that have access to the host processor.

16. The system on a chip of claim 15, where the peripheral device comprises a Universal Asynchronous Receiver/Transmitter (UART), a timer, an interrupt, a memory and a data storage.

17. The system on a chip of claim 15, further comprising a dedicated, secure communications bus connecting the first and second SCPUs, the secure communications bus inaccessible by the host processor and inaccessible by third-party clients with access to the host processor of the SOC.

18. The computing system of claim 1, further comprising:
an instruction checker configured to determine a security level of a request received by the host processor from the client device; wherein,
the first SCPU is further configured to execute an instruction in response to the received request being of the first security level; and
the second SCPU is further configured to execute the instruction in response to the received request being of the second security level.

19. The system on a chip of claim 11, wherein the plurality of sensors are configured to measure at least one of a voltage or a temperature at a predetermined point on the chip.

20. The system on a chip of claim 15, wherein the functions of the first security level comprise management of root keys associated with content stored on the memory storage device and the functions of the second security level comprise management of the content stored on the memory storage device.

* * * * *

UNITED STATES PATENT AND TRADEMARK OFFICE
CERTIFICATE OF CORRECTION

PATENT NO. : 8,931,082 B2  Page 1 of 1
APPLICATION NO. : 13/705991
DATED : January 6, 2015
INVENTOR(S) : Stephane Rodgers et al.

It is certified that error appears in the above-identified patent and that said Letters Patent is hereby corrected as shown below:

<u>In the Claims:</u>

In Column 6, line 25, please delete "comprisinq" and insert --comprising--

Signed and Sealed this
Twenty-eighth Day of April, 2015

Michelle K. Lee
*Director of the United States Patent and Trademark Office*